United States Patent [19]

Howe

[11] 3,768,880
[45] Oct. 30, 1973

[54] BALL BEARING DEVICE WITH BARRIER SEAL

[76] Inventor: Wesley C. Howe, 2910 Stearns Hill Rd., Waltham, Mass. 02154

[22] Filed: Aug. 27, 1971

[21] Appl. No.: 175,537

[52] U.S. Cl. ............................................. 308/187.2
[51] Int. Cl. ............................................. F16c 33/78
[58] Field of Search ..................... 308/187.1, 187.2; 277/53

[56] References Cited
UNITED STATES PATENTS

| 2,275,996 | 3/1942 | Searles | 308/187.2 |
| 2,267,875 | 12/1941 | Reynolds | 308/187.2 |
| 3,071,385 | 1/1963 | Greiner | 308/187.2 |
| 3,350,148 | 10/1967 | Sanguinetti | 308/187.2 |
| 2,375,166 | 5/1945 | Cooper | 308/187.2 |
| 2,701,732 | 2/1955 | Van Dorn | 308/187.2 |

Primary Examiner—Charles J. Myhre
Assistant Examiner—Barry Grossman
Attorney—Harold E. Cole

[57] ABSTRACT

A ball bearing device has a substantially frictionless, barrier seal between a cage with ball bearings and an outer shield. Said seal extends around the outer surface of the inner raceway and in close contact therewith and is normally spaced from said cage and also from the inner surface of the outer raceway and from said outer shield, and said outer shield is spaced from the outer surface of the inner raceway.

8 Claims, 2 Drawing Figures

Patented Oct. 30, 1973

3,768,880

INVENTOR.
Wesley C. Howe
BY Harold E. Cole
Attorney

BALL BEARING DEVICE WITH BARRIER SEAL

The principal object of my invention is to provide for any strain such a device is subject to, keep oil in the cage and also provide a seal against the entry of dust and dirt by spacing the barrier seal from the cage and balls retained therein, and from the inner surface of the outer raceway and from the outer shield, and spacing the outer shield from the outer surface of the inner raceway. The spacing of said barrier seal and outer shield from the raceways allows for any strain on the ball bearing device when it is first actuated, yet prevents substantially all migration of oil from the cage.

The foregoing and other objects which will appear as the nature of the invention is better understood, may be accomplished by a construction, combination and arrangement of parts such as is disclosed by the drawing. The nature of the invention is such as to render is susceptible to various changes and modifications, and, therefore, I am not to be limited to the construction disclosed by the drawing, nor to the particular parts described in the specification; but am entitled to all such changes therefrom as fall within the scope of my invention.

Figure 1:
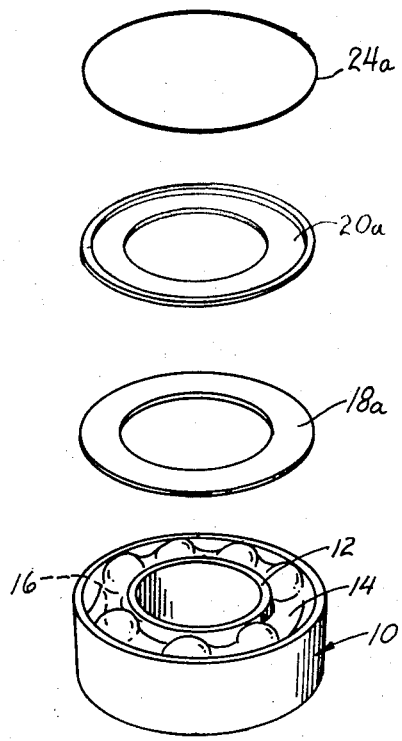
FIG. 1 is an exploded view showing the parts forming my ball bearing device.
Figure 2:
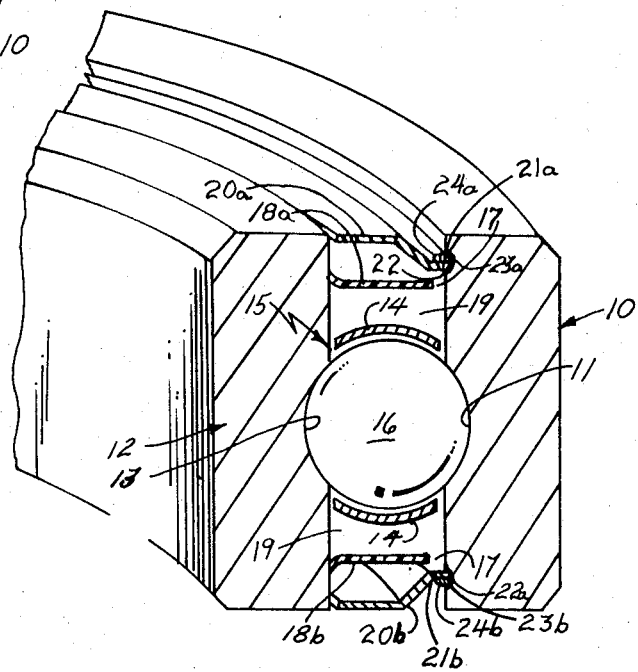
FIG. 2 is a perspective view, partly in section, and greatly enlarged of my ball bearing device.

As illustrated, my ball bearing device has a cylinderical outer raceway 10 having an interior groove 11, and a cylindrical inner raceway 12 having an exterior groove 13 opposite to and spaced from groove 11. As shown the usual ball bearing means 15 has a cage 14 which retains the usual balls 16 that movably extend from and between said grooves 11 and 13.

Outside of said ball bearing means a substantially, frictionless barrier seal 18a is provided in the form of a ring, that is made of tetrafluoroethylene, known under the trademark "Teflon," which contacts the outer circumferential surface of said inner raceway 12 and extends to a point adjacent to, but spaced as at 17 from the inner, circumferential surface of said outer raceway 10.

Said barrier seal 18a has an interior diameter slightly less than the exterior diameter of said inner raceway 12 hence is stretched or enlarged sufficiently so it can be forced into position over said inner raceway. Thus it will cling to the outer periphery of the latter and is normally spaced as at 19 from said ball bearing means 15.

Outside of said barrier seal 18a is the usual shield means having a circular shield 20a and an outer, wire retainer ring 24a that are between said outer raceway and inner raceway. Said shield 20a has a projecting outer rim portion 21a that enters a groove 22 in the inner surface of said outer raceway 10. Said retainer ring 24a enters a groove 23a in the inner surface of said outer raceway 10.

On the opposite side of said ball bearing means 15 is barrier seal 18b, a circular shield 20b, a projecting rim portion 21b, grooves 22, 23b, and a wire retainer 24b. These elements are duplicates of said elements 18a, 20a, 21a, 22, 23a and 24a, and the above description applies to them.

My invention is particularly applicable to precision ball bearings of the miniature type.

I claim:

1. A ball bearing device comprising an outer raceway, an inner raceway spaced from the latter, ball bearing means between said outer and inner raceways, a barrier seal outside of said means and extending around and contacting the exterior surface of said inner raceway and being adjacent to, but spaced from, the inner surface of said outer raceway, said barrier seal being stretchable and its inner circumferential surface being normally of lesser diameter than the exterior surface of said inner raceway and adapted, when stretched to extend around the latter, and a shield outside of said barrier seal and between said inner and outer raceways.

2. A ball bearing device as of claim 1, said outer raceway inner surface having another groove therein, said shield extending into said latter groove, said shield overlapping said seal in a direction towards said outer raceway.

3. A ball bearing device as of claim 1, said barrier seal being formed of tetrafluoroethylene.

4. A ball bearing device as of claim 1, said outer raceway inner surface having a groove therein, said shield extending into said groove.

5. A ball bearing device as of claim 4, said outer raceway inner surface having another groove therein outside the first-mentioned groove, and a retainer ring extending into said another groove.

6. A ball bearing device as of claim 4, said outer raceway inner surface having another groove therein, said shield extending into said latter groove, said shield overlapping said seal in a direction towards said outer raceway.

7. A ball bearing device as of claim 1, said seal being spaced from said shield.

8. A ball bearing device as of claim 1, and another barrier seal and shield as set forth in claim 1; but opposite to and spaced from said first-mentioned seal and shield, said ball bearing means being between the first-mentioned seal and shield and the another seal and shield and spaced from them.

* * * * *